Figure 1:
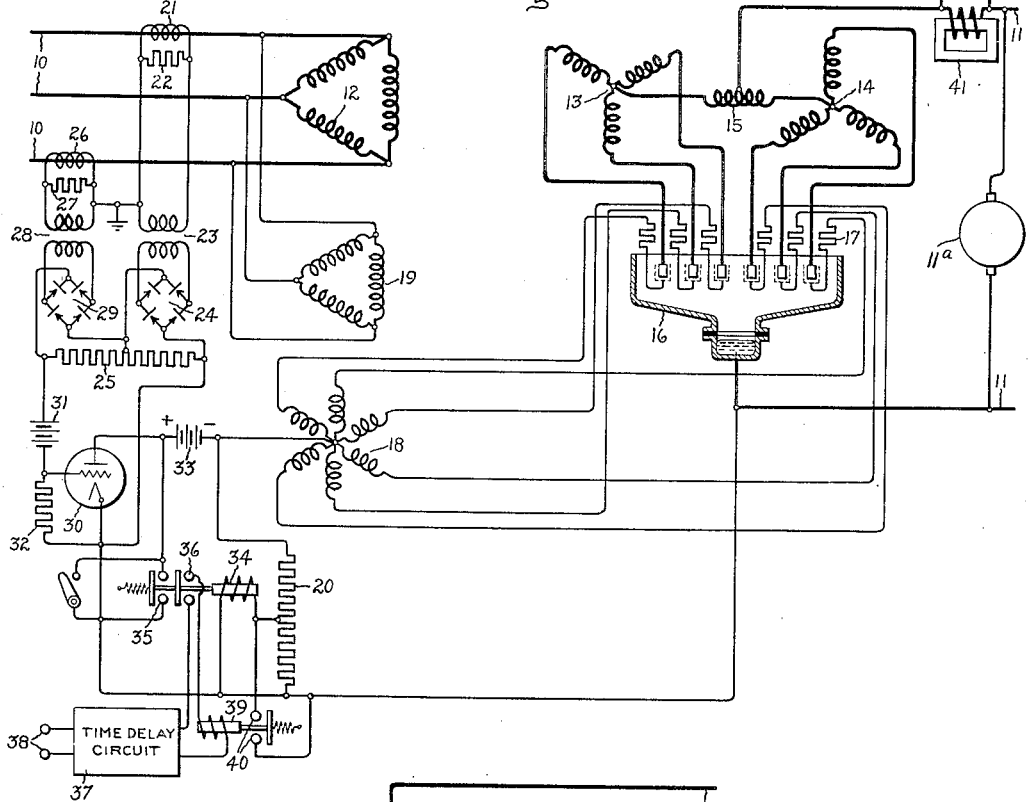

Nov. 26, 1940.  E. F. W. ALEXANDERSON  2,222,696
PROTECTIVE SYSTEM
Filed June 1, 1938 — 2 Sheets-Sheet 1

Inventor:
Ernst F. W. Alexanderson,
by Harry E. Dunham
His Attorney.

Patented Nov. 26, 1940

2,222,696

UNITED STATES PATENT OFFICE 2,222,696

PROTECTIVE SYSTEM

Ernst F. W. Alexanderson, Schenectady, N. Y., assignor to General Electric Company, a corporation of New York Application June 1, 1938, Serial No. 211,122

20 Claims. (Cl. 175—363)

My invention relates to protective systems for electric valve converting apparatus and more particularly to such apparatus utilized between alternating current and direct current circuits.

It is well known that electric valve converting apparatus, in operation, are subject to reverse arcs which may be occasioned by any of a number of disturbing operating conditions. In the instance where the electric valve apparatus is supplying a load circuit which does not have an independent counter-electromotive force, the reverse arcs within the apparatus are limited to arcs between the several anodes of the apparatus in the instance of multi-anode single-cathode valve arrangements, but if the load circuit develops a counter-electromotive force, such for example, as that generated by a direct current motor, the reverse arcs within the vapor electric apparatus may form either between the anodes of the apparatus or between a cathode acting as an anode, and a negative anode acting as a cathode. Such reverse arcs within vapor electric apparatus, if allowed to persist, may cause serious damage not only to the apparatus itself but to the system and other apparatus with which the electric valve converting apparatus is associated. Heretofore, there have been proposed numerous arrangements which have had as their object the elimination or suppression of reverse arcs in vapor rectifiers. In some of these arrangements of the prior art each of the anodes of the various valves or valve apparatus were provided with an auxiliary electrode to which was applied a negative bias upon the occurrence of arc back, reverse arcs or other abnormal current conditions. Where such arrangements are connected to a load circuit which develops a counter-electromotive force it has been necessary to interrupt the direct current circuit by circuit breakers. It would be highly desirable if, under most abnormal current conditions, it were possible to interrupt the reverse arc without disconnecting the direct current circuit in every instance.

It is therefore an object of my invention to provide an improved protective system for electric valve converting apparatus in which upon occurrence of abnormal current conditions, a reverse arc and abnormal current conditions will be suppressed with a maximum of certainty and rapidity.

A further object of my invention is to provide an improved protective system for electric valve converting systems operating between alternating current circuits and direct current circuits in which, upon occurrence of abnormal current conditions, the reversal of current flow in the direct current circuit is delayed sufficiently to permit the various discharge paths to be rendered nonconductive.

Still another object of my invention is to an improved protective system for electric valve converting apparatus operating between direct current circuits and alternating current circuits wherein upon occurrence of abnormal current conditions the reversal of the flow of current in the direct current circuit is delayed sufficiently to permit the reversal of the alternating current potential applied to those valves or arc discharge paths in which reverse arcs are occurring.

Still another object of my invention is to provide an improved method for protecting electric valve converting systems operating between alternating current circuits and direct current circuits so that it will be unnecessary to disconnect the valve converting apparatus from the direct current circuit.

Still another object of my invention is to provide an improved protective system for electric valve converting apparatus operating between direct current circuits and alternating current circuits wherein upon occurrence of abnormal current condition the current supply obtainable from the alternating current source is limited by a rapid increase of the inductance in the alternating current circuit and wherein the reversal of a current in the direct current circuit is retarded for an appreciable time.

Figure 2:
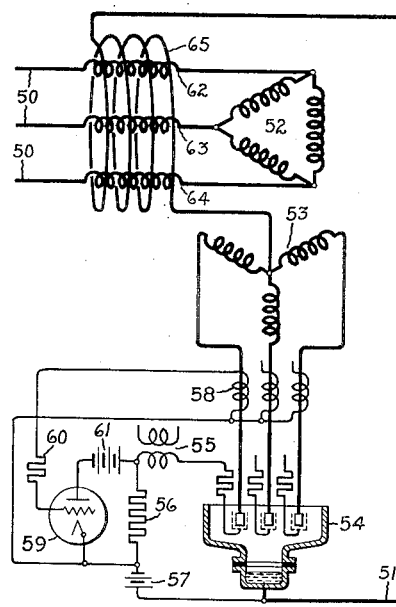
Figure 3:
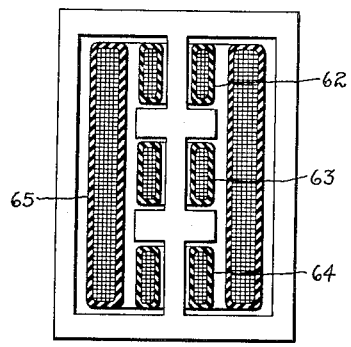
Figure 4:
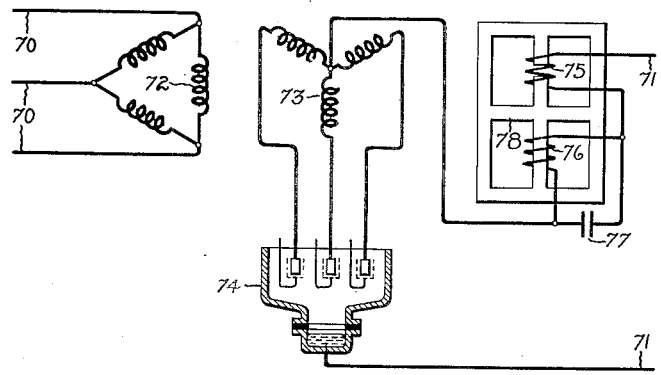

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawings in which Fig. 1 shows an electric valve converting system embodying my invention; Fig. 2 discloses a modification of my invention; Fig. 3 shows a physical arrangement of the structure of one of the elements utilized in the circuit arrangement shown in Fig. 2; and Fig. 4 shows a still further modification of my invention.

Referring now more particularly to Fig. 1 of the drawings, there is illustrated an arrangement embodying my invention for transferring energy between an alternating current circuit 10 and a direct current circuit 11 which, it may be assumed for the purposes of illustration, supplies energy to a load circuit such as a dynamo-electric machine or motor 11a, or to a bus bar to which there are connected other sources of direct current. The system is energized from a transformer having a primary winding 12 and a pair of Y-connected secondary windings 13 and 14, the neutral points of which are interconnected by means of an interphase inductor or transformer 15 having a midpoint which is connected to one side of the direct current circuit 11.

The secondary transformer windings 13 and 14 are each interconnected with the other conductor of the direct current circuit 11 by means of electric arc discharge paths or valves which may be in the form a multi-anode single-cathode device 16. While for the purposes of illustration a multi-anode, single-cathode device 16 has been shown, it will be apparent to those skilled in the art that individual arc discharge paths or valves may be substituted therefor which may be any of the type commonly known in the art and which are preferably provided with an anode, a cathode and a control or starting electrode enclosed within an envelope containing an ionizable medium. In the arrangement shown, each of the anodes of the plurality of arc discharge paths provided by the electric valve device 16 are provided with control electrodes which are connected through suitable current limiting resistors, such as 17, to the secondary windings 18 of a transformer, the primary winding 19 of which is energized from the alternating current circuit 10. The various secondary windings 18 are arranged in star connection and the neutral point thereof is connected through a resistor 20 to the cathode of the electric valve device 16.

The resistor 20 forms a part of a circuit which is responsive to abnormal current conditions occurring in any of the arc discharge paths or valves since any such abnormal current conditions will be reflected back through the transformer windings 12, 13 and 14 to the alternating current circuit 10. This arrangement includes a current transformer 21 connected to one of the conductors of the alternating current circuit 10 and it is bypassed by a suitable damping resistor 22. This current transformer 21 supplies current to a transformer 23, the secondary winding of which is connected to a bridge rectifier 24 which supplies current to a portion of a resistor 25. Another conductor of the alternating current circuit 10 is provided with a similar current transformer 26 which is bypassed by a damping resistor 27 and this arrangement supplies energy to a transformer 28 which is connected across the bridge rectifier 29 the output of which serves to energize the other portion of the resistor 25. The resistor 25 is included in the grid-to-cathode circuit of a valve 30 together with a source of biasing potential 31. The potential of the source 31 is such as normally to maintain the valve 30 non-conductive since this potential appears across the grid-to-cathode resistor 32. Whenever abnormal current conditions occur in the electric valve converting system so as to be reflected in the alternating current circuit 10, the transformer 21 or 26 supplies sufficient energy to the respective bridge rectifier 24 or 29 so that a potential appears across the resistor 25 which potential is sufficient to overcome the negative biasing effect of the source 31, thereby causing the electric valve 30 to be rendered conductive. The anode-to-cathode circuit of the valve 30 includes a suitable source of anode potential 33 and the resistor 20. When the valve 30 has been rendered conductive the flow of current between the anode and cathode thereof causes a voltage to appear across the resistor 20 so that a portion of this voltage serves to energize a relay 34 which is connected across a portion thereof. The relay 34 is provided with two pairs of contacts one pair 35, when closed, serves to short circuit the electric valve 30, and the other pair of contacts 36 serves to energize a time delay circuit 37 which is energized from a suitable source of current applied to the conductors 38. The time delay circuit after a predetermined period of energization operates a relay 39 which is provided with a pair of contacts 40 which short circuits relay 34 and that portion of the resistor 20 which serves initially to energize the relay 34. Upon short circuiting the relay 34 the negative bias impressed upon the control electrode of the electric discharge device 16 is removed and the electric valve 30 will then again be in such condition as to be responsive to abnormal current conditions. In order that this circuit, which is responsive to abnormal current conditions, may operate to render non-conductive the various arc discharge paths, there is provided in one of the conductors of the direct current circuit 11 a reactor 41 having a closed iron core arranged to produce a high reactance at low current values. The reactor 41 operates to delay the reversal of the flow of current in the direct current circuit and upon reversal of current the reactor maintains the current at a relatively low value for an appreciable time. A capacitor 42 which is connected across the reactor 41 facilitates the interruption of the reverse current by the counter-electromotive force produced by the alternating current circuit so that the various arc discharge paths of the electric valve device 16 may all be rendered nonconductive without necessitating disconnecting the electric valve converting system from the direct current conductors 11.

In operation, alternating current from the alternating current circuit 10 is supplied to the primary winding 12 by a transformer having secondary windings 13 and 14 inter-connected by an interphase transformer 15, the midpoint of which is connected to one side of the direct current circuit 11. The electric valve converting apparatus 16 which inter-connects the remaining terminals of the secondary windings 13 and 14 with the other side of the direct current circuit 11 is controlled from a control circuit comprising the transformer windings 18 and 19 which operates periodically and in proper sequence to render the control electrodes of the various anodes sufficiently positive so as to permit the respective anodes to become conductive. The operation of such system obviously will be quite apparent to those skilled in the art. If, however, now abnormal current conditions occur in one or more of the arc discharge paths, such as reverse arcs or arcs between anodes, this will cause the current transformers 21 or 26 to become energized, thereby rendering conductive the valve 30. The valve 30 in turn becoming conductive causes a high negative bias to be impressed across the resistor 20 which is in series with the normal grid control or excitation circuit of the valve means 16. This high negative bias appearing across the resistor 20 tends to render non-conductive all of the various arc discharge paths. Due to the fact, however, that the direct current circuit 11 is connected to a load circuit comprising a dynamo-electric machine or a load circuit to which there are connected other sources of direct current, there is a tendency for one of the anodes to act as a cathode and for the cathode to act as an anode thereby permitting direct current to flow in a reverse direction from cathode to anode. Since this flow of current in a reverse arc is in the opposite direction to the normal flow of direct current from the electric valve converting apparatus it will be desirable to provide some means for retarding the rate of reversal of this current or delaying the reversal thereof so that sufficient time has elapsed to permit the alternating potential appearing across that arc discharge path in which the reverse arc has occurred to reverse the polarity. The result will be that the control grid will regain control over this arc discharge path thereby rendering the path non-conductive. Since reverse arc current has been delayed sufficiently to permit the control electrode, or grid, to regain control it is apparent that it will be unnecessary to disconnect the electric valve converting apparatus from the direct current circuit. The entire electric valve converting apparatus, therefore, has been rendered non-conductive and the time delay circuit 37 is so arranged that after a predetermined time such as but a few cycles of the alternating current circuit 10, the negative bias is removed from the control circuit so the control circuit again becomes effective, thereby causing the electric valve converting apparatus to resume normal operation. The direct current reactor 41 under normal operation of the electric valve converting system is normally saturated and whenever abnormal current conditions appear the direction of flow of current through the reactor tends to reverse. The change in flux conditions in the core structure from a saturated flux condition to a non-saturated condition causes an electromotive force to be built up in the inductive winding which is sufficient to oppose the potential appearing across the circuit 11. As this potential across the inductive winding tends to decrease the capacitor 42 supplies magnetizing current to the winding thereby tending to maintain this potential for a further interval of time. The sizes of the capacitor 42 and the core structure of the reactor 41 are selected with reference to the normal current rating of the electric valve converting apparatus so that the reversal of current flow is delayed upon abnormal current conditions for approximately one-half cycle of alternating current of the alternating current circuit 10. The reason for delaying the reversal of current approximately one-half cycle of alternating current is that if there were no source of electromotive force across the direct current circuit 11 such as a dynamo-electric machine or other direct current sources, the arc back or reverse current would last only one-half cycle because of a negative potential applied to the control grid. Thus the arrangement described not only suppresses the abnormal or short circuit current obtained from the alternating current system but also suppresses the short circuit or reverse current supplied from the direct current circuit. The circuit for biasing the control electrodes of the negative potential is sufficiently rapid normally to render non-conductive all of the arc discharge paths within one-half cycle or less. Even if all of these arc discharge paths are not rendered non-conductive during this time prior to the time when the direct current passes through zero, there still is a sufficient time interval during which the reverse direct current is relatively low because after reversal the magnetizing current of the core structure of the reactor 41 remains low until it begins to saturate.

In Fig. 2 there is shown a further modification of my invention in which an alternating current circuit 50 supplies energy through an electric valve converting apparatus to a direct current circuit 51. The alternating current circuit 50 supplies energy to the transformer winding 52 which energizes the secondary windings 53 which are arranged in star relation so that the neutral point thereof is connected to one side of the direct current circuit 51 and the outer extremities of these windings are connected through a plurality of arc discharge paths or valves such as the valve 54 to the other side of the direct current circuit 51. Each of the anodes of the electric valve device 54 are provided with control grids which are energized from a control circuit including a control transformer 55 which is energized from a suitable source of alternating current, a resistor 56 and a source of biasing potential 57. For the purposes of simplicity a control circuit is shown for only one of the arc discharge paths since it will be apparent to those skilled in the art how the remaining paths are to be controlled and furthermore that the control circuit shown is merely exemplary of many other control circuits which are suitable for the electric valve converting system shown. In order to detect abnormal current conditions occurring in any of the arc discharge paths, each of the conductors between the transformer secondary winding 53 and the various anodes of the arc discharge device 54 is provided with current transformers such as the current transformer 58 which is connected in the grid-to-cathode circuit of an auxiliary electric valve 59 together with a suitable current limiting resistor 60. It may be assumed that the electric valve 59 may normally be maintained non-conductive either due to its normal characteristic or by means of a suitable biasing source of potential in the grid-to-cathode circuit (not shown). The valve 59 is energized from a suitable source of anode potential 61 which is connected in the anode-to-cathode circuit including a resistor 56. Upon occurrence of abnormal current conditions in any of the arc discharge paths of the electric valve 54 a current transformer such as 58 will cause an auxiliary valve such as 59 to be rendered conductive, thereby impressing a high negative potential upon the corresponding resistor 56 thus rendering non-conductive the arc discharge path. In order that this arc discharge path actually become non-conductive it is necessary to delay the reversal of direct current flowing in the direct current circuit 51 and this is accomplished by including a plurality of reactors 62, 63 and 64 in the alternating current conductors of the alternating current circuit 50 and a reactor 65 in the direct current circuit 51. All of these reactors are arranged upon a common core structure which is shown in greater detail in Fig. 3. This core structure is so arranged as to be saturated over normal load range of the electric valve converting apparatus. In such an arrangement the reactance presented to the alternating current circuit is relatively low but upon abnormal current conditions occurring, a relatively high reactance is presented to this circuit. Under normal operating conditions the direct current reactance is realtively low and when abnormal current conditions occur there is a tendency to reverse the direct current flux. At the time that the direct current saturating flux is substantially zero the alternating current windings function as reactors having relatively high inductance values thus limiting the current obtainable from the alternating current source. Since the control electrodes of the various arc discharge paths of the electric valve device 54 are biased negatively it will be apparent to those skilled in the art that the control electrode will now be able to regain control so as to render non-conductive the electric valve converting apparatus. Thus, in this arrangement, the reversal of the flow of the direct current is retarded and during the same period a relatively high reactance value is presented to the alternating current source so that the current available from the alternating current source is limited in value.

While the arrangements shown in Figs. 1 and 2 utilize different circuits responding to abnormal current conditions for impressing negative bias potentials upon the control circuits and the control electrodes thereby tending to render non-conductive the electric valve converting apparatus, it will of course be apparent to those skilled in the art that many other circuits of this type could be utilized, since it is only necessary to render ineffective the control circuit at a sufficiently rapid rate as to tend to render non-conductive all of the arc discharge paths within a relatively short time prior to the reversal of the direction of flow of current in a direct current circuit.

In Fig. 4 is shown a further modification to which the principles of my invention have been applied wherein alternating current energy from an alternating current source 70 is transmitted through a suitable valve converting system to a direct current circuit 71. A suitable transformer having a primary winding 72 energized from the alternating current source 70 supplies energy to the secondary windings 73 which are interconnected with the direct current source 71 by means of an electric valve device 74. Any suitable circuit may be utilized which will be responsive to abnormal current conditions occurring in any of the arc discharge paths to render ineffective the control circuit and in the instance of grid control valve apparatus to bias these grids negatively so as to tend to render the valve device non-conductive. In order that this may be accomplished prior to the reversal of the flow of current in the direct current circuit 71 there is included in one of the conductors of the direct current circuit 71 a reactor having a winding 75 mounted upon a core structure having an air gap therein and a second reactor 76 mounted upon the same core structure without an air gap therein. A suitable capacitor 77 is connected across the reactor 76. The reactor 75 which is connected across the core structure having an air gap therein serves as a smoothing reactor during normal operation and the reactor 75 under normal operating conditions is saturated. The cores of the reactors 75 and 76 are separated by a magnetic shunt 78. Both reactors 75 and 76, therefore, tend to be effective as smoothing reactors during normal operation, but under abnormal current conditions the reactor 76 tends to generate electromotive force which is sufficiently great as to oppose the electromotive force appearing across the direct current circuit 71 for a predetermined time. Capacitor 77 serves to maintain this voltage for a still further interval of time in accordance with the principles of operation set forth in connection with the arrangement shown in Fig. 1.

While I have shown and described my invention in connection with certain specific embodiments, it will of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States is:

1. In an electric valve converting system having a plurality of controlled arc discharge paths interconnecting an alternating current circuit and a direct current circuit having a source of counter electromotive force, the method of protecting said system upon occurrence of reverse arc conditions in said discharge paths which comprises rendering said paths non-conductive with respect to said alternating current circuit, and delaying the reversal of flow of current in said direct current circuit until said paths have become non-conductive with respect to said direct current circuit.

2. In an electric valve converting system having a plurality of arc discharge paths interconnecting a direct current circuit having a source of counter electromotive force with an alternating current circuit, the method of protecting said system upon occurrence of reverse arc conditions in any of said discharge paths which comprises tending to render all of said paths non-conductive with respect to said alternating current circuit and reducing the rate of reversal of the direction of flow of current in said direct current circuit sufficiently to permit all of said paths to be rendered non-conductive.

3. A protective system for an electric valve converting system having a plurality of controlled electric discharge paths interconnecting a direct current circuit having a source of counter electromotive force and an alternating current circuit comprising means responsive to an abnormal current condition of any of said discharge paths arranged to tend to render non-conductive all of said discharge paths, and means for delaying the reversal of current flow in said direct current circuit sufficiently to permit said discharge paths to be rendered non-conductive.

4. A protective system for an electric valve converting system having a plurality of controlled electric discharge paths interconnecting a direct current circuit having a source of counter electromotive force and an alternating current circuit comprising means responsive to an abnormal current condition of any of said discharge paths, said means tending to render non-conductive all of said discharge paths, and means for delaying the reversal of current flow in said direct current circuit for substantially one-half cycle of said alternating current circuit.

5. In an electric valve converting system having a plurality of controlled arc discharge paths interconnecting alternating current and direct current circuits, said direct current circuit providing a source of counter electromotive force, the method of protecting said system upon occurrence of reverse arc conditions in any of said discharge paths which comprises rendering all of said paths non-conductive with respect to said alternating current circuit and delaying the reversal of the flow of current in said direct current circuit sufficiently to permit the reversal of the alternating current potential applied to those paths conducting reverse arcs.

6. A protective system for an electric valve converting system having a plurality of electric discharge paths interconnecting alternating current and direct current circuits, said direct current circuit providing a source of counter electromotive force, a control circuit for said discharge paths, means responsive to an abnormal current condition in any of said discharge paths for rendering ineffective said control circuit, and a reactor connected in said direct current circuit and arranged to be saturated during normal operating conditions and to delay the reversal of flow of current in said direct current circuit upon abnormal current conditions.

7. A protective system for an electric valve converting system having a plurality of electric discharge paths interconnecting current and direct current circuits, said direct current circuit providing a source of counter electromotive force, a control circuit for said discharge paths, means responsive to abnormal current conditions in said discharge paths for rendering ineffective said control circuit, and reactive means connected in said direct current circuit for delaying the reversal of flow of current in said circuit for substantially one-half cycle of alternating current, said reactive means having a core structure arranged to be saturated under normal operating conditions of said electric valve converting system.

8. The combination of a protective system with an electric valve converting system having a plurality of electric discharge paths interconnecting direct current and alternating current circuits, said direct current circuit providing a source of counter electromotive force, a control circuit for said discharge paths for determining the moments of ignition thereof, means responsive to an abnormal current condition of any of said discharge paths for rendering said control circuit ineffective thereby to tend to render said discharge paths non-conductive, and means for delaying the reversal of current flow in said direct current circuit for substantially one-half cycle of said alternating current circuit.

9. A protective system for an electric valve converting system having a plurality of electric discharge paths interconnecting alternating current and direct current circuits, said direct current circuit providing a source of counter electromotive force, a control circuit for said discharge paths, means responsive to abnormal current conditions in said discharge paths for rendering ineffective said control circuit, reactive means connected in said direct current circuit for delaying the reversal of flow of current in said circuit for substantially one-half cycle of alternating current, said reactive means having a core structure arranged to be saturated under normal operating conditions of said electric valve converting system, and a capacitor connected across said reactive means to furnish magnetizing current thereto so that upon abnormal conditions the direct current flowing through said reactor is greater than that flowing in said direct current circuit.

10. The combination of a protective system with an electric valve converting system comprising a plurality of electric discharge paths interconnecting an alternating current circuit with a direct current circuit having a source of counter electromotive force, a control circuit for said discharge paths, means responsive to abnormal current conditions in said discharge paths for rendering said control circuit ineffective, a reactor in each conductor of said alternating current circuit, a reactor in one conductor of said direct current circuit, and a common core structure for all of said reactors arranged to be saturated during normal operation of said valve converting system.

11. The combination of a protective system with an electric valve converting system comprising a plurality of electric discharge paths interconnecting an alternating current circuit with a direct current circuit having a source of counter electromotive force, a control circuit for said discharge paths, means responsive to abnormal current conditions in said discharge paths for rendering said control circuit ineffective, means responsive to said abnormal current conditions for limiting the alternating current supplied to said system and for delaying the reversal of direct current flow in said direct current circuit comprising a reactor connected in each conductor of said alternating current circuit, a reactor connected in one conductor of said direct current circuit, and a common core structure for all of said reactors arranged to be saturated during normal operation of said electric valve converting system.

12. A proective system for an electric valve converting system having a plurality of electric discharge paths interconnecting a direct current circuit having a source of counter electromotive force and an alternating current circuit, said discharge paths each being provided with a control electrode, a control circuit for said control electrode, means responsive to an abnormal current condition of any of said discharge paths for negatively biasing said control electrodes thereby rendering ineffective said control circuit, and impedance means adapted to have a high impedance at low current values for delaying the reversal of current flow in said direct current circuit for substantially one-half cycle of said alternating current circuit.

13. A protective system for an electric valve converting system having a plurality of electric discharge paths interconnecting a direct current circuit having a source of counter electromotive force and an alternating current circuit, each of said electric discharge paths being provided with a control electrode, a control circuit for said control electrodes, means responsive to an abnormal current condition of any of said discharge paths for biasing said control electrodes so as to render ineffective said control circuit and to tend to render non-conductive all of said discharge paths, and impedance means adapted to have a high impedance at low current values and a low impedance at normal or high current values for delaying the reversal of current flow in said direct current circuit sufficiently to permit said discharge paths to be rendered non-conductive.

14. The combination of a protective system with an electric valve converting system having a plurality of electric discharge paths interconnecting a direct current circuit having a source of counter electromotive force and an alternating current circuit each of said electric discharge paths being provided with a control electrode, a control circuit for said control electrode for determining the moments of ignition thereof, means responsive to an abnormal current condition of any of said discharge paths for rendering said control circuit ineffective and biasing said control electrodes thereby to tend to render said discharge paths non-conductive, and reactance means adapted to have a high reactance at low current values for delaying the reversal of current flow in said direct current circuit for substantially one-half cycle of said alternating current circuit.

15. The combination of a protective system with an electric valve converting system comprising a plurality of electric discharge paths interconnecting an alternating current circuit with a direct current circuit having a source of counter electromotive force, each of said discharge paths being provided with a control electrode, a control circuit for said control electrodes, means responsive to abnormal current conditions in said discharge paths for negatively biasing said control electrodes thereby rendering said control circuit ineffective, a reactor in each conductor of said alternating current circuit, a reactor in one conductor of said direct current circuit, and a common core structure for all of said reactors arranged to be saturated during normal operation of said electric valve converting system.

16. A protective system for an electric valve converting system having a plurality of electric discharge paths interconnecting alternating current and direct current circuits, said direct current circuit providing a source of counter electromatic force, a control electrode for each of said electric discharge paths, a control circuit for said control electrodes, means responsive to abnormal current conditions in said discharge paths for negatively biasing said control electrodes, normally saturated reactive means connected in the direct current circuit, and a capacitor connected across said reactive means to furnish magnetizing current thereto so that upon abnormal current conditions of said electric valve converting system, the direct current flowing through said reactor is greater than the current flowing in said direct current circuit.

17. A protective system for an electric valve converting system having a plurality of electric discharge paths interconnecting alternating current and direct current circuits, said direct current circuit providing a source of counter electromotive force, a control electrode for each of said discharge paths, a control circuit for said control electrodes, means responsive to abnormal current conditions in said discharge paths for negatively biasing said control electrode thereby rendering ineffective said control circuit, normally saturated reactive means connected in said direct current circuit, a capacitor associated with at least a portion of said reactive means, said reactive means and said capacitor cooperating to delay the reversal of flow of current in said direct current circuit sufficiently to permit said biasing means to render non-conductive all of said electric discharge paths.

18. The combination of a protective system with an electric valve converting system comprising a plurality of electric discharge paths interconnecting an alternating current circuit with a direct current circuit having a source of counter electromotive force, each of said discharge paths being provided with a control electrode, a control circuit for said discharge paths, means responsive to abnormal current conditions in any of said discharge paths for negatively biasing all of said control electrodes thereby rendering said control circuit ineffective, means responsive to abnormal current conditions for limiting the alternating current supplied by said circuit and for delaying the reversal of flow of current in said direct current circuit comprising a reactor in each conductor of said alternating current circuit, a reactor in a conductor of said direct current circuit, and a common core structure for all of said reactors arranged to be saturated during normal operation of said valve converting system.

19. A protective system for an electric valve converting system having a plurality of electric discharge paths interconnecting alternating current and direct current circuits, said direct current circuit providing a source of counter electromotive force, each of said electric discharge paths being provided with a control electrode, a control circuit for said discharge paths, means responsive to an abnormal current condition in any of said discharge paths for negatively biasing said control electrodes and thereby rendering ineffective said control circuit, and a reactor connected in said direct current circuit and arranged to be saturated during normal operating conditions of said valve converting system, said reactor operating to delay the reversal of flow of current in said direct current circuit upon abnormal current conditions sufficiently to permit said negatively biasing means to render nonconductive all of said electric discharge paths.

20. A protective system for an electric valve converting system having a plurality of electric discharge paths interconnecting alternating current and direct current circuits, said direct current circuit providing a source of counter electromotive force, a control electrode for each of said electric discharge paths, a control circuit for said control electrodes, means responsive to abnormal current conditions in said discharge paths for negatively biasing said control electrodes thereby rendering ineffective said control circuits, and reactive means connected in said direct current circuit for delaying the reversal of flow of current in said circuit for substantially one-half cycle of alternating current, said reactive means having a core structure arranged to be saturated under normal operating conditions of said electric valve converting system.

ERNST F. W. ALEXANDERSON.

CERTIFICATE OF CORRECTION.

Patent No. 2,222,696.                                        November 26, 1940.

ERNST F. W. ALEXANDERSON.

It is hereby certified that error appears in the printed specification of the above numbered patent requiring correction as follows: Page 3, second column, line 68, for "realtively" read --relatively--; page 5, first column, line 11, claim 7, before "current" insert --alternating--; and second column, line 20, claim 12, for "proective" read --protective--; page 6, first column, line 20-21, claim 16, for "electromatic" read --electromotive--; and that the said Letters Patent should be read with this correction therein that the same may conform to the record of the case in the Patent Office.

Signed and sealed this 21st day of January, A. D. 1941.

(Seal)                                                                 Henry Van Arsdale,
Acting Commissioner of Patents.